United States Patent
Sinopoli et al.

(10) Patent No.: US 6,478,063 B1
(45) Date of Patent: Nov. 12, 2002

(54) RADIAL MEDIUM TRUCK TIRE WITH ORGANIC POLYMER REINFORCED TOP BELT OR BREAKER

(75) Inventors: Italo M. Sinopoli, Canton, OH (US); John Gomer Morgan, North Canton, OH (US); Anthony Hardy, Bettendorf (LU); Murat Yasar Susutoguu, Bissen (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/437,553

(22) Filed: Nov. 10, 1999

Related U.S. Application Data

(62) Division of application No. 09/013,370, filed on Jan. 26, 1998, now abandoned, which is a division of application No. 08/427,524, filed on Mar. 24, 1995, now Pat. No. 5,743,975.

(51) Int. Cl.[7] .............................. B60C 9/00; B60C 9/08; B60C 9/18; B60C 9/20; B60C 9/22
(52) U.S. Cl. ........................ 152/527; 152/451; 152/526; 152/531; 152/532; 152/534; 152/536; 152/556; 152/565
(58) Field of Search ................................. 152/527, 531, 152/533, 536, 534–535, 451, 556, 532, 565, 526

(56) References Cited

U.S. PATENT DOCUMENTS

| | | |
|---|---|---|
| 3,757,843 A | 9/1973 | Carr |
| 3,786,851 A * | 1/1974 | Mirtain et al. ............... 152/531 |
| 3,850,219 A | 11/1974 | Snyder |
| 3,851,693 A | 12/1974 | Takemura et al. |
| 3,874,436 A | 4/1975 | Hashida et al. |
| 3,990,493 A | 11/1976 | Caretta |
| 4,140,168 A | 2/1979 | Caretta |
| 4,146,415 A | 3/1979 | Caretta et al. |
| 4,176,703 A | 12/1979 | Nojima et al. |
| 4,371,025 A | 2/1983 | Canevari et al. |
| 4,498,514 A | 2/1985 | Maathuis et al. |
| 4,724,881 A | 2/1988 | Poque et al. |
| 4,762,158 A * | 8/1988 | Furuya et al. .......... 152/536 X |
| 5,027,877 A | 7/1991 | Tamura et al. |
| 5,032,198 A | 7/1991 | Kojima et al. |
| 5,111,864 A | 5/1992 | Nakano et al. |
| 5,365,988 A | 11/1994 | Soderberg et al. |

FOREIGN PATENT DOCUMENTS

| | | |
|---|---|---|
| DE | 1943407 | 5/1970 |
| EP | 0407071 | 1/1991 |
| EP | 0420333 | 4/1991 |
| EP | 0448901 | 10/1991 |
| EP | 0477771 | 4/1992 |
| EP | 0605177 | 7/1994 |
| JP | 379402 | 4/1991 |
| JP | 466305 | 3/1992 |
| JP | 5286308 | 4/1993 |
| JP | 624205 | 2/1994 |

OTHER PUBLICATIONS

"Treating Tire Fabrics of HYTEN", DuPont Company Textile Fibers Department, Oct. 1989 Wilmington, Delaware.
Research Disclosure 30076, "Polyamide Monofilament", E.I. duPont de Nemours & Co., Inc., Apr. 1989.

* cited by examiner

Primary Examiner—Adrienne C. Johnstone
(74) Attorney, Agent, or Firm—David E. Wheeler; Nancy T. Krawczyk

(57) ABSTRACT

A radial medium truck (RMT) tire has belt or breaker plies which are reinforced by organic reinforcement cords or filaments. In one embodiment, organic monofilaments are used in the belt or breaker plies which have the following characteristics: at least 2,000 denier (2,200 dTex), a tenacity of at least 3.5 g/denier (31 cN/Tex), an initial modulus of at least 30 g/denier (265 cN/Tex) and a shrinkage of at most 6%.

10 Claims, 5 Drawing Sheets

RADIAL MEDIUM TRUCK TIRE WITH ORGANIC POLYMER REINFORCED TOP BELT OR BREAKER

The present application is a divisional application of U.S. patent application Ser. No. 09/013,370, filed Jan. 26, 1998, since abandoned, which was a divisional application of U.S. patent application 08/427,524, filed Mar. 24, 1995, now U.S. Pat. No. 5,743,975, issued on Apr. 28, 1998.

BACKGROUND OF THE INVENTION

The present invention relates to radial truck tires, preferably radial medium truck (RMT) pneumatic tires.

The treads of RMT tires are subject to puncture from stones and other sharp objects in the road surface. In many cases, although the puncture is not deep enough to penetrate the belt package and destroy the tire, it is deep enough to expose the steel reinforcement cords of the belt package to water and air, and such exposure can cause the belt package to corrode. This problem is aggravated when tires are used in mixed service, i.e., partially on paved surfaces and partially on non-paved surfaces, such as exist on the Alaska Highway. Although rust does not significantly affect the strength of the reinforcement ply, many tires are scrapped if excessive corrosion is observed on the top belt when the tread is skived from the tire in preparation for retreading.

In the conception of the present invention, it was proposed to replace some of the steel reinforced belts in the belt package, and at least the top belt, with a non-corrosive belt made with organic reinforcement, or to add such a belt to the top of the belt package. It was decided to test large diameter, obround nylon 66 monofilaments for such purpose. Monofilaments of similar structure have been used in radial ply tires as described in U.S. Pat. No. 4,850,412 issued to Gupta, Jul. 25, 1989.

SUMMARY OF THE INVENTION

A pneumatic radial medium truck tire of the invention comprises at least one pair of parallel annular beads, at least one carcass ply wrapped around said beads, two to twelve belts or breakers disposed over the carcass ply in a crown area of the tire, tread disposed over the belts or breakers, and sidewalls disposed between the tread and the beads. The majority of the belts or breakers in the tire are reinforced with steel filaments or cords, and the remaining belts or breakers are reinforced with organic polymer filaments or cords. The top belt or breaker is reinforced with organic polymer filaments or cords.

In an illustrated embodiment, the organic filaments or cords are nylon monofilaments which have an obround (oblong) cross section and are at least 2000 denier (2200 dTex) and have a tenacity of at least 3.5 g/denier (31 cN/Tex), an initial modulus of at least 30 g/denier (265 cN/Tex), an elongation at break of at least 17% and a shrinkage of at most 6%.

In various embodiments of the invention, the top belt or breaker ply is a nylon monofilament reinforced ply wherein the reinforcement cords have an angle of 0° to 35° with respect to the tire. In some such constructions, an organic monofilament reinforced ply is used as an overlay/top breaker wherein the ply extends beyond the edges of the other breakers, and the angle of the reinforcing cords are maintained at the same angle as the steel reinforcement cords in the breaker ply next radially below, or are at angles which cross said steel reinforcement cords.

Specific constructions of such tires are also claimed.

It is an object of this invention to reduce corrosion of RMT tires caused by penetration of the tread by sharp object of this therefore improve their retreadability. Other objects of this invention will be apparent from the following description and claims.

DEFINITIONS

As used herein and in the claims, the terms

"obround" refers to a cross sectional shape having a width greater than its height and having no sharp corners (e.g. oval), and generically is intended to include similar rounded shapes, "axial" and "axially" refer to directions which are parallel to the axis of rotation of a tire, "radial" and "radially" refer to directions that are perpendicular to the axis of rotation of a tire, "bead" refers to that part of a tire comprising an annular tensile member wrapped by ply cords and shaped, with or without other reinforcement elements to fit a designed tire rim, "carcass" refers to the tire structure apart from the belt structure, tread, undertread, and sidewall rubber but including the beads, (carcass plies are wrapped around the beads), "equatorial plane (EP)" refers to a plane that is perpendicular to the axis of rotation of a tire and passes through the center of the tire's tread, "belt" or "belt ply" refers to an annular layer or ply of parallel cords, woven or unwoven, underlying the tread, not anchored to the bead, and having cord angles of from 5° to 35° with respect to the EP of the tire, "breaker plies" refers to annular reinforcement members in the crown area of a bias ply tire having longitudinal reinforcement members having an angle (in the illustrated embodiment) with respect to the equatorial plane of the tire of at least 5° less than the angle of such reinforcement members in the bias carcass plies, "crown" refers to substantially the outer circumference of a tire where the tread is disposed, "rivet" refers to the amount of space between two adjacent cords, "tenacity" refers to breaking stress expressed as force per unit linear density of an unstrained specimen (cN/Tex or gm/denier), (usually used in textiles), "modulus" refers to the ratio of the change in stress to the change in strain, and "organic" refers to compounds, including polymers, containing a carbon backbone or structure, which can be shaped, stretched of formed into a particular physical configuration.

DETAILED DESCRIPTION OF THE INVENTION

Figure 1:
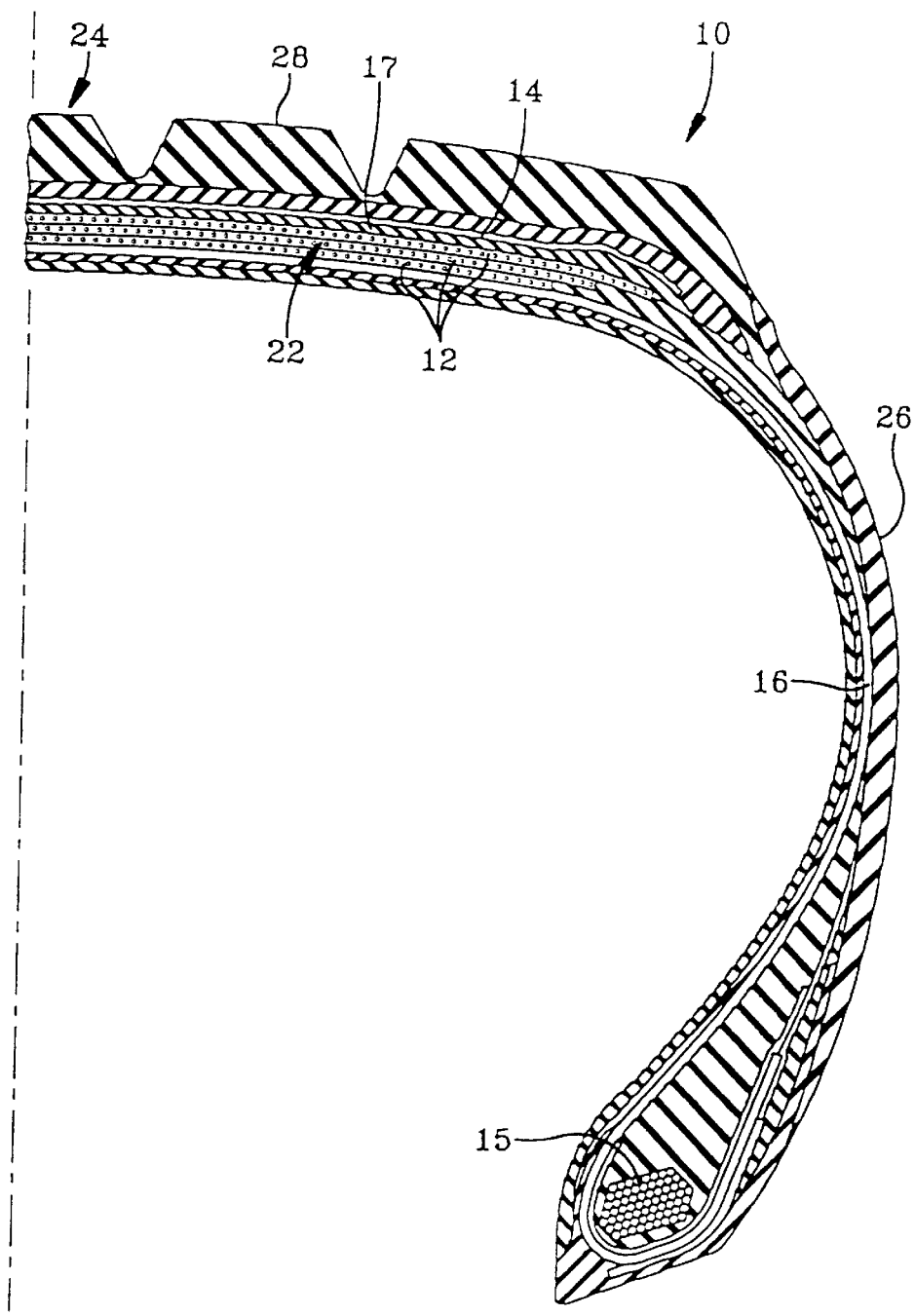
FIG. 1 is a cross-sectional view of a tire according to one embodiment of the invention taken in a plane that contains the axis of rotation of the tire.

With reference now to FIG. 1, a preferred embodiment of a pneumatic tire 10 is illustrated which comprises a pair of substantially parallel annular beads 15, carcass ply 16 wrapped around the beads, belts or breakers 22 comprising three steel cord reinforced plies 12 and one organic polymer reinforced ply 14 disposed over the carcass ply 16 in a crown portion 24 of the tire, tread 28 disposed over the belts or breakers, and sidewalls 26 disposed between the tread and the beads.

The carcass plies and breaker plies, as is common in the art, are reinforced with substantially parallel longitudinal reinforcing members. The present invention relates specifically to pneumatic tires which have belts or breaker plies which are at least partially reinforced by organic cords or filaments. Any organic material, having sufficient strength and durability for the purpose described, can be used in the invention. Examples of such materials are thermoplastics such as nylon 46, nylon 66, nylon 6, and nylon 12; polyesters such as polyethyleneterephthalate (PET), and polyethylenenapthalate (PEN); and polyvinyl alcohol (PVA).

In the illustrated embodiment, longitudinal reinforcing cords comprising nylon monofilaments have been used. The nylon monofilaments used in the belts or breaker plies have an obround (oblong) cross section (flat) and are at least 2000 denier (2200 dTex) and have a tenacity of at least 3.5 g/denier (31 cN/Tex), an initial modulus of at least 30 g/denier (265 cN/Tex), preferably at least 40 g/denier (353 cN/Tex), an elongation at break of at least 17% and a shrinkage of at most 6%.

Although laboratory data has suggested that reinforcing composites made using such organic reiforcement do not have adequate penetration resistance for the intended purpose, experiments utizing such reinforcement plies in tires have shown that such monofilament reinforcing cords have good penetration resisance in the environment of a tire, and initial road testing has shown that corrosion in tires using top belt poies reinforced by such monofilaments has been greatly reduced, and the ease of retread preparation has been greatly increased.

Figure 2:
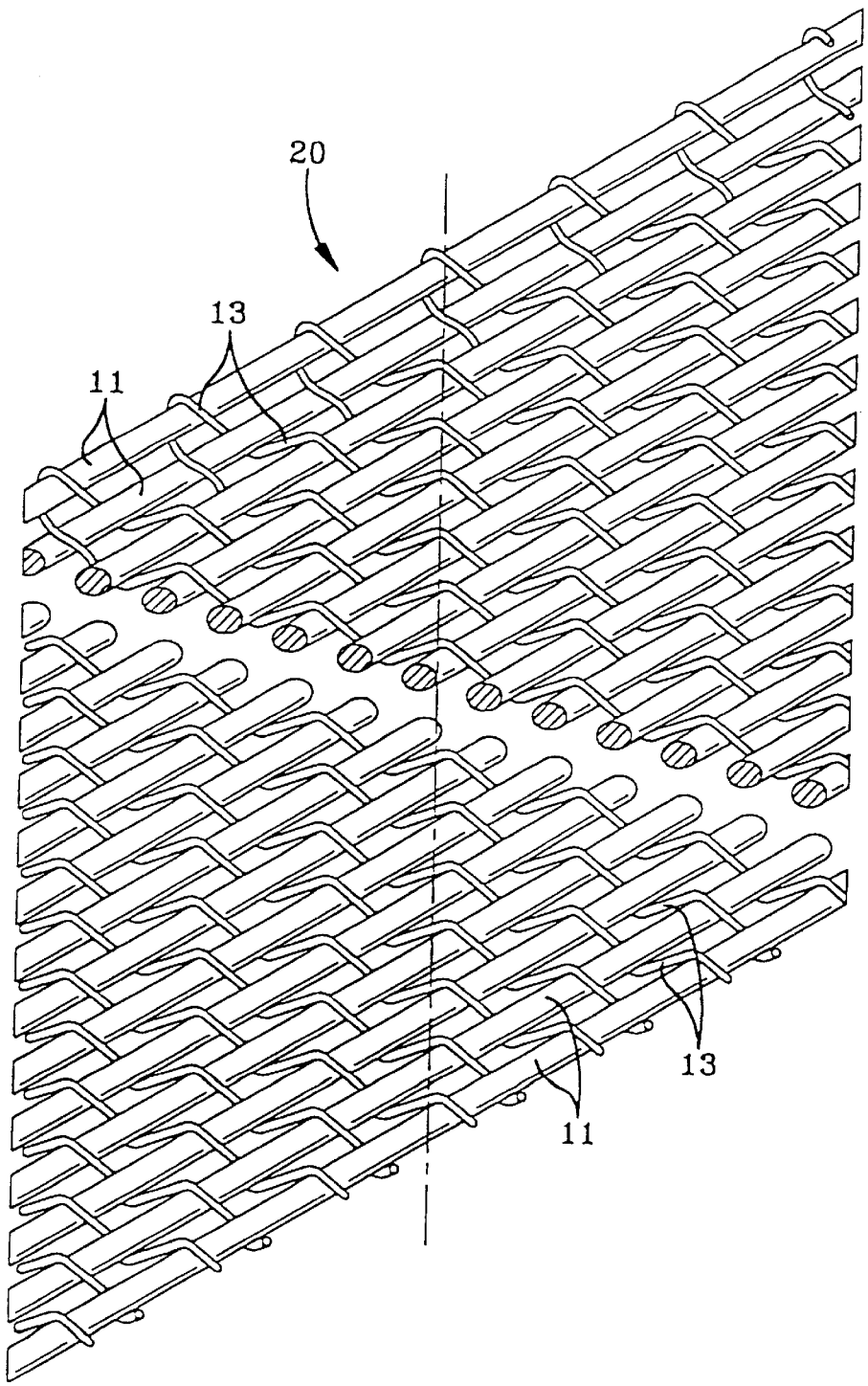
FIG. 2 illustrates a portion of a reinforcing ply using obround reinforcing monofilaments.

With reference to FIG. 2, monofilaments 11 may be held in relationship to one another by pick filaments 13 to form fabric 20 for their incorporation in an elastomeric material to form a ply.

Those skilled in the art will recognize that materials having greater strength and elongation properties could improve the performance of any tire made therewith. It is believed that the above data, together with resistance to chemicals, heat and humidity, represents the minimum physical requirements of a monofilament reinforcement material used to make tires in accordance with the present invention.

The maximum tenacity for this type of material is estimated to be about 10 g/denier (89cN/tex), the maximum initial modulus is estimated to be about 70 g/denier (620 cN/tex), and the maximum elongation at break is estimated to be about 22%.

Monofilaments of nylon, particularly well suited for implementing the invention are those sold by E.I. Dupont de Nemours & Co. of Wilmington, Del., under the Trademark "HYTEN".

In the tire 10 of the invention, the carcass ply is wrapped over beads 15 such that reinforcement cords have an angle of between about 10° and 90°, preferably about 90° with respect to the equatorial plane of the tire. By definition, the reinforcement members in any breaker plies have an angle at least 5° less than the angle of the reinforcement members in the carcass plies, and accordingly, the reinforcement members in any belt plies have an angle of between about 5° and 35°, preferably about 22°, with respect to the equatorial plane of the tire.

Figure 3:
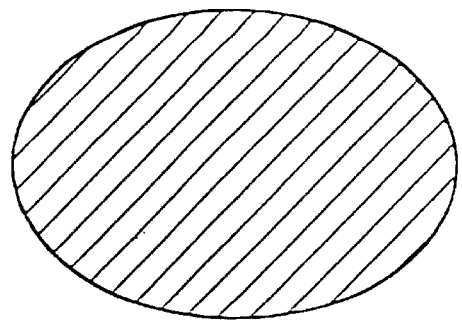
FIG. 3 is an enlarged cross-sectional view of an obround monofilament cord suitable for use in the present invention.
Figure 4:
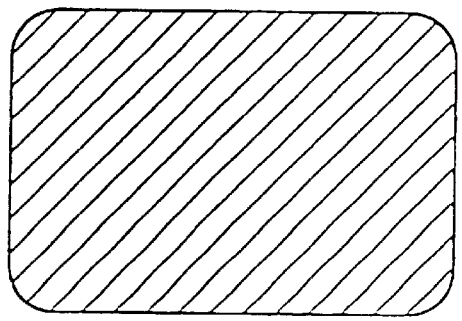
FIG. 4 is an enlarged cross-sectional view of an alternative monofilament cord with rounded edges.
Figure 5:
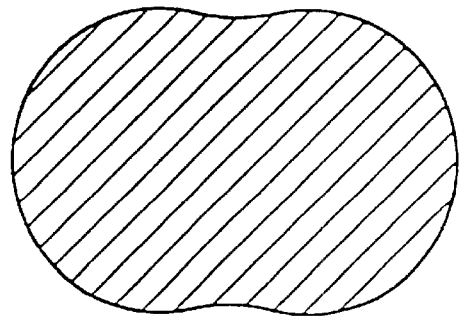
FIG. 5 is an enlarged cross sectional view of a crimped or flattened monofilament cord.

With reference now to FIGS. 3, 4 and 5, cross sections of nylon monofilaments particularly suited for practicing the invention are illustrated. Round filaments, slightly flattened filaments with a substantially oval section (See FIG. 3), strongly flattened filaments with rounded off edges (see FIG. 4) or filaments having a central constriction (See FIG. 5), can be used. Preferably, the nylon monofilaments should have their greatest linear cross-sectional extent, i.e., their width, one to five times the linear cross-sectional extent perpendicular to said width, i.e., their thickness. In order to improve the adhesion of rubber to the filaments, profiled, serrated filaments, or filaments with a multi-lobal shaped cross-section can be of advantage. It may also be of advantage in practicing the invention to coat the filaments with a suitable adhesive, for example a conventional RFL adhesive, or to otherwise treat the filaments to promote adherence of rubber to the monofilaments.

The organic textile reinforcing elements used in the top belt or breaker ply can each comprise a monofilament of at least 2,000 denier (2,200 dTex), for example 2,000 denier to 9,000 denier (10,000 dTex), preferably between about 4,000 and 6,000 denier (4,400 and 6,700 dTex) nylon. A monofilament is by definition a cord consisting of one filament. When using monofilaments of 4000 denier and up, the monofilaments in each ply are disposed with a density of about 8 to 16 EPI (ends per inch), preferably 10 to 15 EPI in order to yield the desired mechanical characteristics of the tire.

Tires have been manufactured according to a preferred embodiment using obround 6,700 dTex (6,000 denier) nylon monofilaments having the following approximate characteristics:

section height: 0.47 mm
section width: 1.45 mm
tenacity: 81.5 cN/Tex (9.2 g/denier)
lase: 202 N @ 7% elongation
elongation at break: 19%
shrinkage: 3.7%

The different strength measurements were made using a standard tensile tester, and the shrinkage measurement was made using a Testrite shrinkage tester. Tires made using plies having nylon 66 monofilament reinforcing members demonstrate increased tire endurance and durability.

Figure 6:
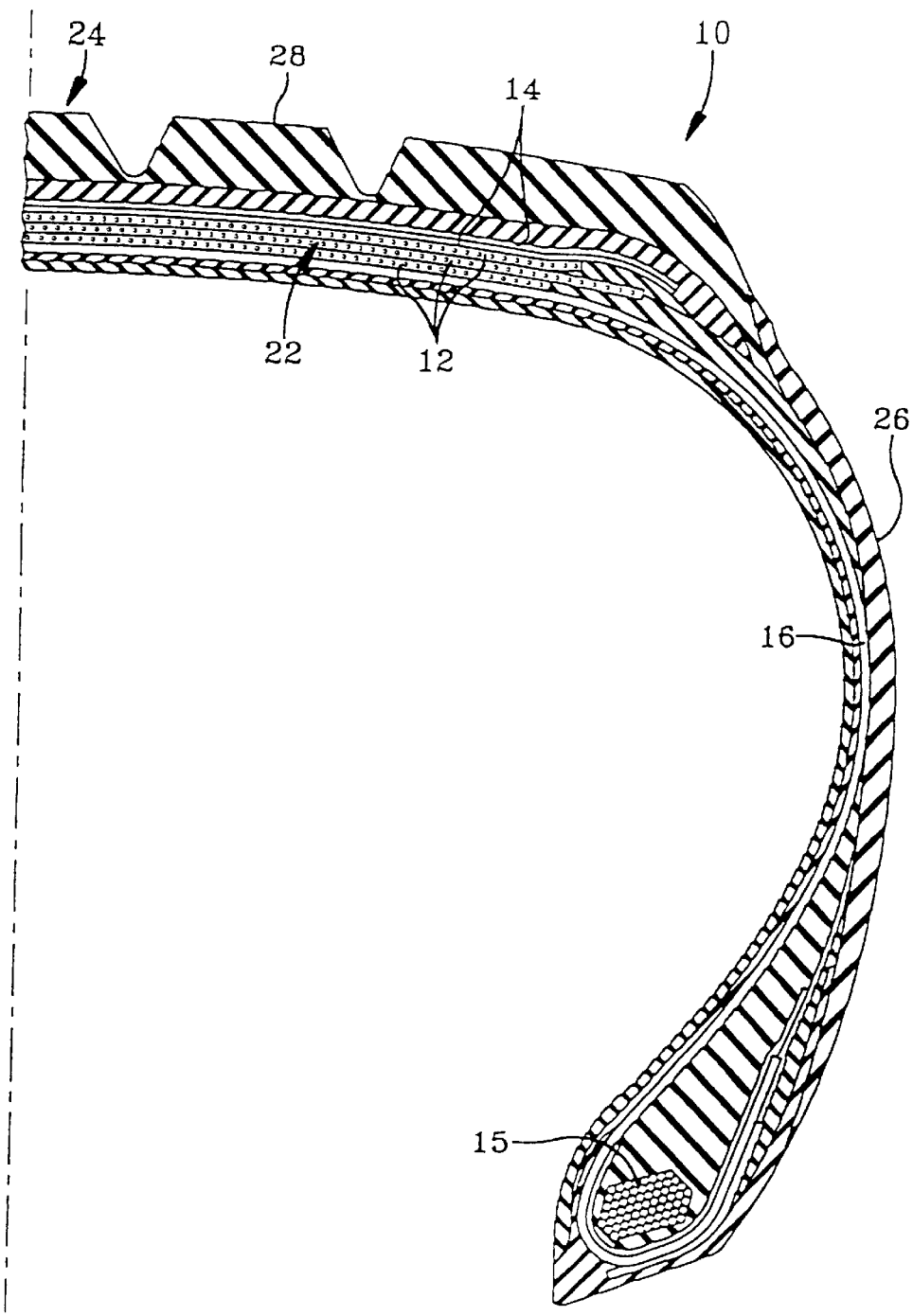
FIG. 6 is a cross sectional view of an alternative embodiment of a tire of the invention.

In illustrated embodiments of the invention, RMT tires have been made wherein the conventional construction has been changed by removing the top steel reinforced belt ply and replacing it with one nylon monofilament reinforced ply 14 over three steel reinforced belt plies 12 (in a first embodiment) (see FIG. 1), and two nylon monofilament reinforced plies 14 replace one steel reinforced belt ply (in a second embodiment) (see FIG. 6).

The end count for the steel reinforced plies may vary from 9 to 16 epi, and in the illustrated embodiments, the end count is 12 to 14 epi.

In one illustrated embodiment, one ply having 9,000 denier (10,000 dtex) obround nylon 66 reinforcement was used at 12.5 epi. In an alternative embodiment, two plies of 6,000 denier (6,700 dtex) obround nylon reinforcement were used at 15 epi.

Figure 7:
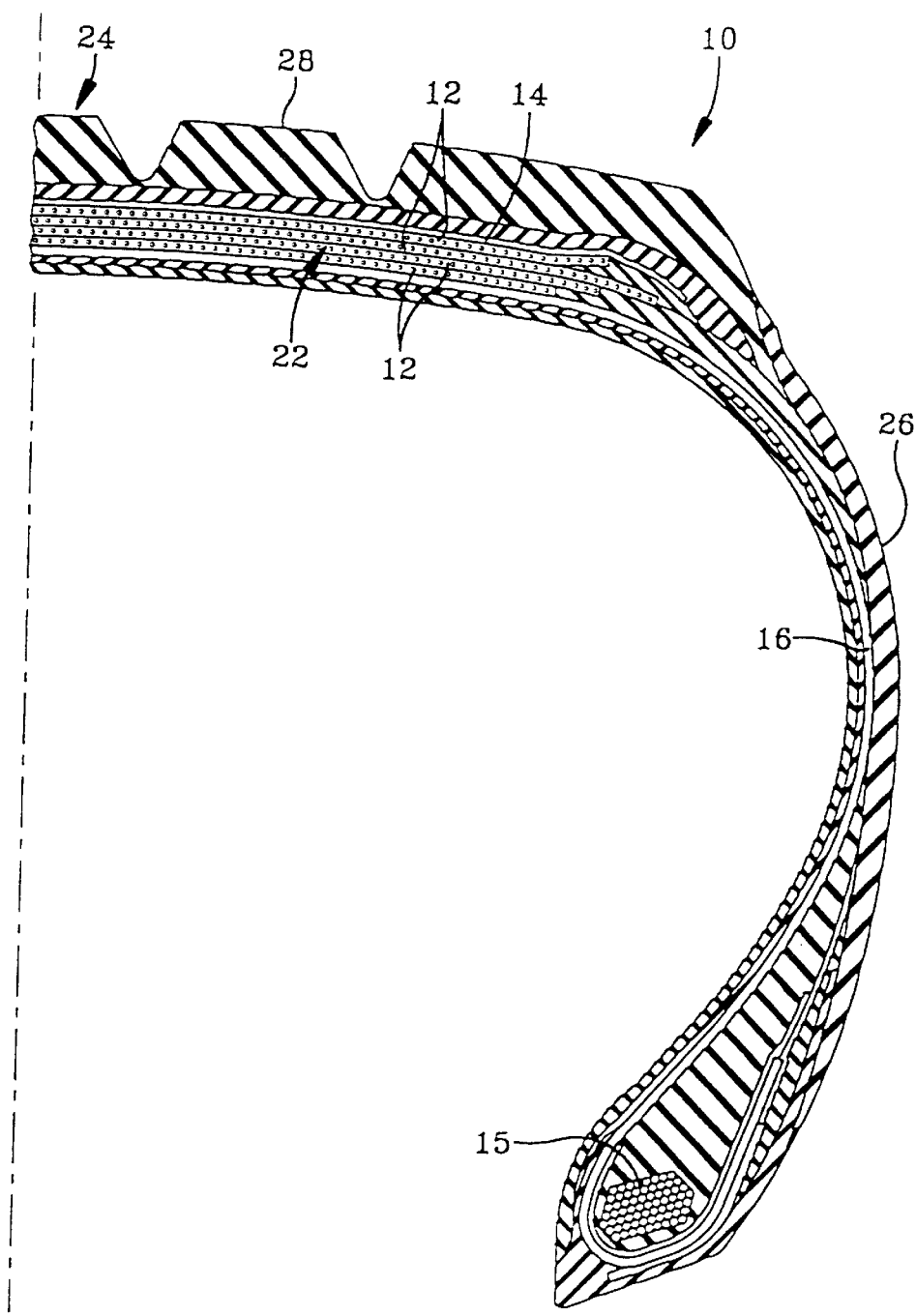
FIG. 7 is a cross sectional view of another alternative embodiment of a tire of the invention.

Also, tires have been made using a conventional construction where an additional nylon monofilament reinforced ply (having an angle of 0° to 35° with respect to the EP of the tire) has been added to the top of the belt package (see FIG. 7). In one illustrated embodiment, tires have been made wherein a monofilament non-wire reinforced ply has been used as an overlay/top breaker wherein the ply extends beyond the edges of the other breakers, and the angle of the reinforcing cords are maintained at the same angle as the steel reinforcement cords in the breaker ply next radially below. By applying the top ply wherein the cords have the same angle as the reinforcement cord in the ply below, a less stiff belt package, that has improved flexibility and enveloping properties, is provided.

It may be possible to further improve the characteristics of such a belt package by positioning an optional thick cushion compound 17 (see FIG. 1) between the top breaker and the next breaker radially below.

Those skilled in the art will recognize that other steel reinforced belts in the belt package may be replaced by plies reinforced with nylon reinforcement cords, it being most important to the present invention, with an object to prevent corrosion in RMT tires subjected to severe use.

It has been found that tires made according to the invention have improved retreadability because the damage to the top breaker or belt is reduced. The time required for the buzz out operation (the grinding away of damaged spots created by the penetration of stones into the belt package) is reduced, and the possibility of breaker or belt edge separation is reduced. These properties are believed to be due, at least in part, to improved enveloping properties of the tread; the improved aged adhesion possible between an organic cord or filament and rubber as compared to the aged adhesion between rubber and steel; and the corrosion resistance of the organic reinforcement as compared to the corrosion resistance of steel.

The invention is further illustrated with reference to the following examples.

EXAMPLE 1

This example illustrates the impact resistance of belt composites made using 14 epi 6000 denier (6700 dTex) Hyten® monofilament reinforcement in place of 8 epi steel cord reinforcement. The data shows that the energy to rupture for the monofilament composite is down about 15 to 35% as compared to the steel cord composite. Testing was carried out using 10 inch by six inch single layered, unidirectional composites where the reinforcing cords are embedded in tread rubber. The control is a composite made with 8 epi conventional steel cord reinforcement. The following data illustrates the velocity of the plunger used in the test at impact, the energy to rupture, and the breaking load.

TABLE 1

| Construction | Impact Veloc (mph) | Energy to Rupture (in–lb) | Break Load (lb) |
|---|---|---|---|
| Control | 4.00 | 124 | 583 |
|  | 3.75 | 128 | 602 |
|  | 3.63 | 129 | 528 |
|  | 3.56 | 120 | 575 |
|  | 3.50 | 121 | 602 |
|  | 3.43 |  | Nodamage |

TABLE 1-continued

| Construction | Impact Veloc (mph) | Energy to Rupture (in–lb) | Break Load (lb) |
|---|---|---|---|
| 6000d nylon monofil | 4.00 | 92 | 465 |
|  | 3.75 | 98 | 489 |
|  | 3.69 | 79 | 395 |
|  | 3.50 | 82 | 450 |

The data shows that the control absorbed approximately 25 to 45% more energy than the nylon reinforced composite before rupture.

EXAMPLE 2

Tires size 11R24.5 (Goodyear G188 Unisteel construction) were made in the conventional manner except that the top (4th) belt was replaced by one ply reinforced by 6,000 denier (6700 dtex) Hyten® monofilaments.

This example illustrates weight savings obtained by using nylon monofilaments in a belt construction in an RMT tire where at least one of the steel belts is replaced by an organic monofilament reinforced ply.

In the table below, A represents 3×0.22/9×0.20+1 high tensile wire plies, and B represents 3×0.265/9×0.245 high tensile wire plies. The weights of each construction are provided in the numbers below the construction. All weights below are treatment weights in pounds, reinforcement plus rubber.

TABLE 2

|  | Control | 1st Hyten build | 2nd Hyten build |
|---|---|---|---|
| Belt 1 | A (12) | A (12) | A (12) |
|  | 2.30 | 2.30 | 2.30 |
| Belt 2 | B (12) | B (12) | B (14) |
|  | 5.61 | 5.61 | 6.05 |
| Belt 3 | B (12) | B (12) | B (14) |
|  | 5.06 | 5.06 | 5.45 |
| Belt 4 | B (08) | 6000d Hyten | 6000d Hyten |
|  | 3.32 | (14) 1.60 | (14) 1.60 |
| Total weight | 16.29 lbs | 14.57 lbs | 15.40 lbs |
| weight saving | — | 1.72 lbs | 0.89 lbs |

Numbers in parentheses are ends per inch

This example also illustrates laboratory test data for tires using a monofilament reinforced top belt (# 4 belt) as described in example 1 in place of the conventional steel cord reinforced top belt. The first three belts are conventional steel cord reinforced belts. Control 1 and nylon 1 denote the first build that was subjected only to laboratory testing. Control 2 and nylon 2 denote the second build which was also used for road testing, as reported in Example 3.

TABLE 3

|  | Control 1 | 6000d nylon 1 | control 2 | 6000d nylon 2 |
|---|---|---|---|---|
| Roll Resistance Rating | 100 | 103 |  |  |
| Burst (psi) | 410 | 385 |  |  |
| Plunger energy (in–lb) | 32134 | 33810 | 39610 | 51563 |
| 120" smooth wheel crown durability (mi) | 16025 | 18419 | 14000 | 10691 |

TABLE 3-continued

|  | Control 1 | 6000d nylon 1 | control 2 | 6000d nylon 2 |
|---|---|---|---|---|
| step load durability (mi) | 15000 3 8000 1 | 15000 4 finish | | |
| Heat Rise 30 mph (F) Center, Shoul | | | 215 203 | 211 203 |

In the table "finish" means no damage was seen when the test was stopped, and the numbers in the right of the step load durability column denote the number of tires.

The data in the table shows that physical properties of a tire made using a nylon reinforced top belt are substantially equal to a conventionally reinforced control tire.

EXAMPLE 3

Sixty tires were placed in a focus test group (30 control tires and 30 tires with a 6000 d (6700 dTex) nylon top belt from the second build described in Example 2) to determine properties in actual use. The properties observed are reported in the following table.

TABLE 4

|  | Rate of Wear Ranking | Control | 6000d nylon |
|---|---|---|---|
| | | 100 | 99 |
| cut/chip/chunk | None | 17% | 10% |
| | light | 33% | 34% |
| | moderate | 37% | 42% |
| | heavy | 13% | 14% |

The table shows that properties of the tire made with the nylon reinforced top belt, overall, are comparable to the control.

EXAMPLE 4

Tires size 315/80R22.5 (Goodyear G391 Unisteel construction) were made in the conventional manner except that tires were made wherein the top (4th) belt was replaced by one ply reinforced by 9,000 denier (10,000 dtex) Hyten® monofilaments.

A total of 146 tires (96 control and 50 test) were placed in buses and logging trucks in Sweden at the end of 1993.

The retreadable tires were retreaded in GW30 Goldwing contour from Marangoni and were mounted on trucks.

Tires were photographed before and after the buffing operation.

Results

The following results should be viewed only as an indication of a trend until all the remaining tires are returned and analyzed:

Bus Tires

All bus tires were retreadable with few or no buzz-outs per tire.

G391 tires were holding stones and there were some cases of stone penetration.

There was no evidence that the nylon top breaker reduced stone penetrations.

Logging Tires

G250 tires with nylon top breaker were more retreadable (8 out of 8) than those with steel cord top breaker (4 out of 9) However, this was mainly due to breaker edge separations seen on the control tires.

Details

Size/ Design: 315/80R22.5 G291/G391/G250/G386 Luxembourg, negative crown

Service: Steer axle of inter-city buses (G291/G391) Steer axle of logging trucks (G250/G386)

|  | BUSSES | TRUCKS | TOTAL |
|---|---|---|---|
| No of tires placed | 74 | 75 | 146 |
| No of tires inspected | 24 (32%) | 38 (53%) | 62 (42%) |

TABLE 5

| | Fitment Details | | | | | | |
|---|---|---|---|---|---|---|---|
| | BUS 315/80R22.5 STEER | | | LOGGING TRUCKS 315/80R22.5 STEER | | | |
| | CONTROL G291 | HYTEN* G391 | TOTAL | CONTROL G250 | HYTEN* G250 1 LAYER | G386 | TOTAL |
| Tire placed | 40 | 34 | 74 | 18 | 18 | 36 | 72 |
| Tires inspected | 17 | 7 | 24 | 9 | 8 | 21 | 38 (53%) |
| Tires retreadable | 17 | 7 | | 4 | 8 | 4 | |
| % retreadable | 100 | 100 | | 44 | 100 | 19 | |

*10,000 dtex (9000 denier) HYTEN, 12.5 epi

EXAMPLE 5

This example illustrates the results of running tires of the invention in the sugar cane fields of Brazil where tires experience severe tread and top breaker damage.

A fabric made from 6,700 dtex flat nylon 66 monofilament of Dupont (Hyten) was dipped in Luxembourg and sent to Brazil for tire building. Test tires were placed in sugar cane, mineral transport service and in intercity bus service accounts together with control tires and with Michelin XZY tires.

Tires from sugar cane service were returned to Goodyear's Sao Paulo retread shop and Goodyear Americana for retreading.

The retread operation was observed including buffing, buzz-out, and cementing operations. All of the tires were inspected to determine the actual number of buzz-out points on each tire.

Conclusions

Hyten tires are easier and quicker to process (buzz-out preparation) than standard tires.

Among severely damaged tires, the hyten tires are more acceptable for retreading compared to standard tires.

No specific debelting equipment is required for preparing hyten tires for retreading.

Details

Tire Size/design: 10.00R20 G386
Fleet: Usine da Barra Grande (Sugar cane service)
% On/Off Road: 50% on 50% off
Vehicles: MB2325 6 ×4

|  | Control G386 | HYTEN* G386 | Michelin XZY |
| --- | --- | --- | --- |
| No of tires replaced | 40 | 40 | 40 |
| No of tires inspected | 40 | 40 | 40 |
| Breaker 4 | B | Hyten* |  |
| Km Removal | 45555 | 41597 | 40234 |
| Ave. Buzz-outs/tire | 85 | 43 | 24 |
| No. Tires with Tread repairs | 11 | 12 | 10 |

*6.700 dTex Hyten, 15 EPI

Tire size/design: 11.00R22 G386
Fleet: Usine da Barra (Sugar cane service)
% On/Off Road: 50% on/50% off
Vehicles: Scania 6x4
Constructions:

|  | Control G386 | HYTEN* G386 | Michelin XZY |
| --- | --- | --- | --- |
| Breaker 4 | B | Hyten* |  |
| No of vehicles | 8 | 3 | 4 |
| No of tires placed | 80 | 30 | 40 |
| No. of tires inspected | 64 | 26 | 32 |
| Km removal | 19724 | 19588 | 17923 |
| Ave. buzz-outs per tire | 75 | 47 | 54 |
| No. tires with tread repairs | 7 | 3 | 2 |

*6700 dTex Hyten, 15 epi

Interim Results/Observations

1. Hyten tires and control tires had similar worn tire appearance.
2. There was no evidence of reduced tire protection with hyten.
3. When cuts reached the hyten layer, damage stayed localized.
4. Hyten top breaker damage spots required only soft wire brushing.
5. Buzz-out processing was easier and faster with hyten tires than with the control tires.
6. Excessive hyten top breaker damage could be easily removed by rasping (1 tire). No need for a special debelting device.
7. Tires with severely damaged steel cord top breaker were rejected from processing. Similarly damaged hyten top breaker tires could be processed..

While the invention has been specifically illustrated and described, those skilled in the art will recognize that the invention may be variously modified and practiced without departing from the spirit of the invention. The scope of the invention is limited only by the following claims.

What is claimed is:

1. A pneumatic radial medium truck tire comprising at least one pair of parallel annular beads, at least one carcass ply wrapped around said beads, four to twelve belts disposed over said at least one carcass ply in a crown area of said tire, a tread disposed over said belts, and sidewalls disposed between said tread and said beads, wherein the majority of said belts are reinforced with steel filaments or cords, and the remaining belts are reinforced with organic polymer filaments or cords, and wherein the top belt is reinforced with organic polymer filaments or cords inclined at an angle with respect to the equatorial plane of the tire which is substantially the same as the angle of the steel filaments or cords of the adjacent steel reinforced belt radially inward of said top belt and wherein the organic filaments or cords are nylon monofilaments with an obround cross section, at least 2000 denier (2200 dTex), have a tenacity of at least 3.5 g/denier (31 cN/Tex), an initial modulus of at least 30 g/denier (265 cN/Tex), an elongation at break of at least 17% and a shrinkage of at most 6%.

2. The tire of claim 1 wherein the four to twelve belts are four steel belts and one organic belt wherein the organic belt is the top belt.

3. The tire of claim 1 wherein the axial edges of the top belt extend axially beyond the axial edges of the steel belts.

4. The tire of claim 1 wherein said organic monofilaments are nylon 66.

5. The tire of claim 1 wherein the monofilaments in said organic top belt are at a concentration of 8 to 16 ends per inch and the steel filaments or cords in said steel belts are at a concentration of 9 to 16 ends per inch.

6. The tire of claim 1 wherein the nylon monofilaments are coated with a resorcinol formaldehyde latex (RFL) adhesive.

7. The tire of claim 1 wherein the nylon monofilaments are coated with an epoxy subcoat and a resorcinol formaldehyde latex (RFL) adhesive top coat.

8. The tire of claim 1 wherein the top belt is reinforced with 9,000 denier (10,000 dtex) obround nylon 66 monofilaments.

9. The tire of claim 1 wherein the top belt is reimforced with 6,000 denier (6,700 dtex) obround nylon 66 monofilaments.

10. A pneumatic radial medium truck tire comprising at least one pair of parallel annular beads, at least one carcass ply wrapped around said beads, four to twelve belts disposed over said at least one carcass ply in a crown area of said tire, a tread disposed over said belts, and sidewalls disposed between said tread and said beads, wherein the majority of said belts are reinforced with steel filaments or cords, and the remaining belts are reinforced with organic polymer filaments or cords, wherein a nylon monofilament reinforced ply having monofilament reinforcement cords at an angle of 5° to 35° with respect to the equatorial plane of the tire is the top ply of the belt package wherein the top ply extends beyond the edges of the other belts, and the monofilament reinforcing cords in the top ply are at the same angle as the steel filaments or cords in the adjacent steel reinforce belt radially below.

* * * * *

UNITED STATES PATENT AND TRADEMARK OFFICE
CERTIFICATE OF CORRECTION

PATENT NO.     : 6,478,063 B1
DATED          : November 12, 2002
INVENTOR(S)    : Italo M. Sinopoli et al.

It is certified that error appears in the above-identified patent and that said Letters Patent is hereby corrected as shown below:

<u>Title page,</u>
Item [75], the correct spelling of the fourth listed inventor is
-- Murat Yasar Susutoglu --.

Signed and Sealed this

Twenty-second Day of April, 2003

JAMES E. ROGAN
*Director of the United States Patent and Trademark Office*